United States Patent
Umetani

(10) Patent No.: US 7,515,654 B2
(45) Date of Patent: Apr. 7, 2009

(54) DATA SLICING CIRCUIT USING MULTIPLE THRESHOLDS

(75) Inventor: Masato Umetani, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 617 days.

(21) Appl. No.: 11/215,013

(22) Filed: Aug. 31, 2005

(65) Prior Publication Data

US 2006/0077850 A1 Apr. 13, 2006

(30) Foreign Application Priority Data

Sep. 14, 2004 (JP) .............................. 2004-266515

(51) Int. Cl.
*H04L 27/22* (2006.01)
(52) U.S. Cl. .................... 375/316; 375/345; 369/59.17
(58) Field of Classification Search .................. 375/316; 369/59.17
See application file for complete search history.

(56) References Cited

U.S. PATENT DOCUMENTS

| | | | | |
|---|---|---|---|---|
| 6,396,953 B1 * | 5/2002 | Abbey | ........................ | 385/218 |
| 6,735,260 B1 * | 5/2004 | Eliezer et al. | ................ | 375/316 |
| 6,907,202 B1 * | 6/2005 | Ide et al. | ...................... | 398/208 |
| 2002/0067781 A1 * | 6/2002 | Brianti et al. | ................ | 375/341 |
| 2003/0177438 A1 * | 9/2003 | Waschura et al. | ........... | 714/819 |
| 2003/0198302 A1 * | 10/2003 | Song | .......................... | 375/340 |
| 2006/0020412 A1 * | 1/2006 | Bruensteiner | ............... | 702/117 |

FOREIGN PATENT DOCUMENTS

JP 2001-319422 11/2001

* cited by examiner

*Primary Examiner*—David C Payne
*Assistant Examiner*—Leon Flores
(74) *Attorney, Agent, or Firm*—Studebaker & Brackett PC; Donald R. Studebaker

(57) ABSTRACT

A data slicing circuit that receives a demodulated signal including a known data pattern followed by unknown data generates at least two different threshold potentials intermediate between the peak and bottom levels of the demodulated signal. Different comparators compare the demodulated signal with the different threshold potentials to generate at least two different binarized signals. During reception of the known data pattern, a signal processing circuit compares the binarized signals with the known data pattern, preferably oversampling the binarized signals, and selects the binarized signal that best matches the known data. The selected binarized signal is then used to receive the unknown data.

1 Claim, 4 Drawing Sheets

DATA SLICING CIRCUIT USING MULTIPLE THRESHOLDS

BACKGROUND OF THE INVENTION

1. Field of the Invention

The present invention relates to a data slicing circuit for binarizing a demodulated signal in a receiving device in a wireless digital data communication system.

2. Description of the Related Art

In wireless digital data communication systems, digital data are modulated onto an analog radio-frequency carrier signal. The demodulated signal is an analog signal that is sliced and sampled to recover the transmitted digital data. Slicing refers to comparing the demodulated signal with a threshold potential to decide whether the demodulated signal represents a '1' or '0' bit.

In one known type of data slicing circuit, the threshold potential is a smoothed value of the demodulated signal itself, obtained from a low-pass filter. Referring to FIG. 1, the high-frequency analog demodulated signal DS output from the demodulator 21 is supplied to a low-pass filter 22 and one input terminal of a comparator 23. The low-pass filter 21 removes high-frequency components from the analog signal and leaves a low-frequency component Vlf, which is supplied to the other input terminal of the comparator 23. The comparator 23 outputs a binary signal D indicating whether the instantaneous level of the demodulated signal DS is above or below the level of the low-frequency component Vlf.

In another known type of data slicing circuit, the threshold potential has a value offset by a fixed amount from the peak level of the demodulated signal. Referring to FIG. 2, the high-frequency analog demodulated signal DS output from the demodulator 31 is supplied to a peak hold circuit 32, which detects and outputs the peak level Vp. A direct-current (DC) offset generator 33 adds a negative DC offset to the peak level to generate the threshold potential Vpo, which is supplied to one input terminal of a comparator 34. The demodulated signal DS is supplied to the other input terminal of the comparator 34. The comparator 34 outputs a binary signal D indicating whether the instantaneous level of the demodulated signal DS is above or below the threshold potential Vpo.

Other examples of conventional data slicing circuits can be found in Japanese Patent Application Publication No. 2001-319422, which uses a low-pass filter, and No. 2001-358780 (or the parent U.S. Pat. No. 6,735,260), which uses maximum and minimum peak detection circuits and sets the threshold potential halfway between the maximum and minimum levels.

A disadvantage of the data slicing circuit in FIG. 1 is that if the demodulated signal includes long segments of data with predominantly just one binary value, the threshold potential approaches the peak or bottom level of the demodulated signal too closely and the error rate rises.

A disadvantage of the data slicing circuit in FIG. 2 is that even if the demodulated signal has a substantially constant maximum peak level, its minimum peak level or bottom level may vary depending on reception conditions. This is particularly true of signals modulated by amplitude shift keying (ASK). It is accordingly difficult or impossible to determine a DC offset that is suitable for all reception conditions.

The data slicing circuit in U.S. Pat. No. 6,735,260 is also unsuitable for reception of this type of signal, with a relatively constant peak level but a varying bottom level, because the optimum threshold potential tends to be closer to stable peak level than to the unstable bottom level.

SUMMARY OF THE INVENTION

An object of the present invention is to binarize a demodulated signal accurately under a variety of reception conditions.

The invented data slicing circuit receives a demodulated signal including a known data pattern followed by unknown data. A peak hold circuit detects and holds the peak level of the demodulated signal. A bottom hold circuit detects and holds the bottom level of the demodulated signal. An intermediate potential generator generates a plurality of threshold potentials intermediate between the peak and bottom levels. A plurality of comparators compare the demodulated signal with these threshold potentials, thereby generating a plurality of binarized signals. During reception of the known data pattern, a baseband signal processing circuit compares the plurality of binarized signals with the known data pattern, preferably oversampling the binarized signals by sampling them at a rate higher than the bit rate of the known data, and selects one of the binarized signals that best matches the known data. The baseband signal processing circuit then continues to use the selected binarized signal to receive the unknown data.

By selecting the binarized signal that best matches the known data in the demodulated signal, the data slicing circuit can receive the unknown data under a wide variety of reception conditions with a minimum number of slicing errors, particularly if the binarized signals are oversampled during the reception of the known data to provide a large population of samples from which to decide which binarized signal matches the known data best.

DETAILED DESCRIPTION OF THE INVENTION

Figure 1:
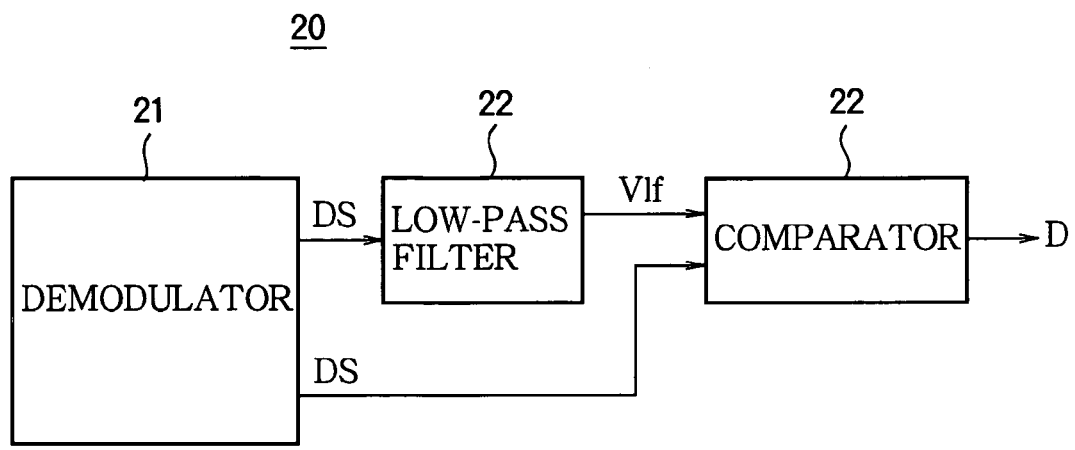
FIG. 1 is a block diagram showing a conventional data slicing circuit using a low pass filter.
Figure 2:
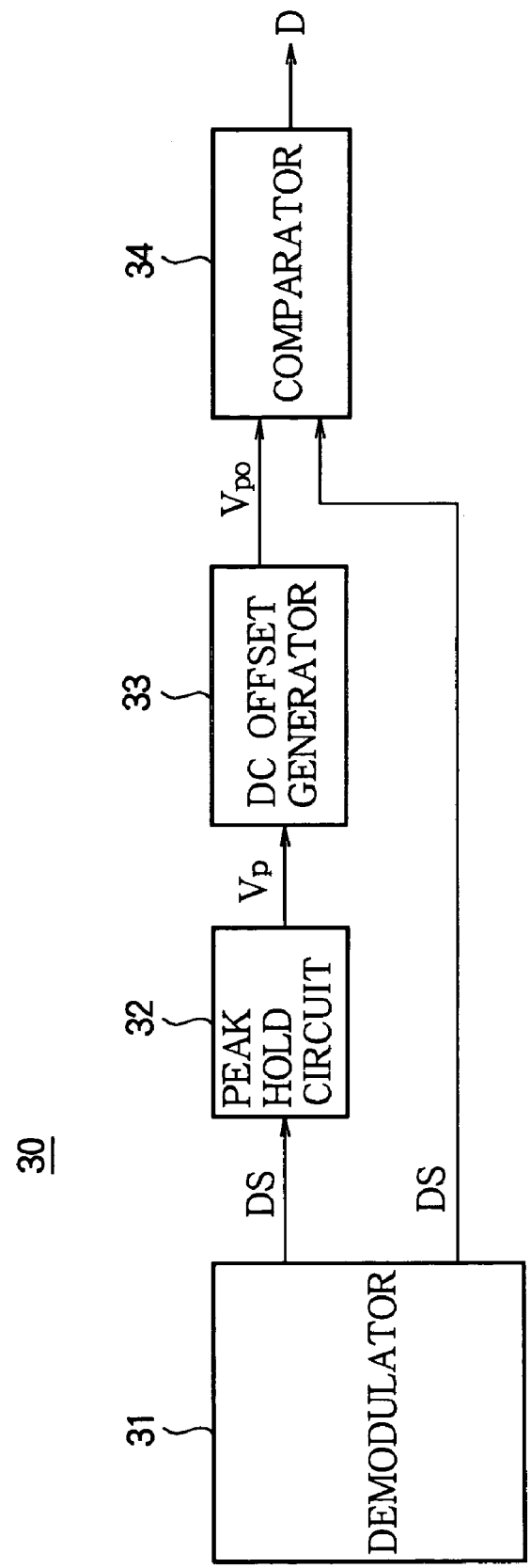
FIG. 2 is a block diagram showing a conventional data slicing circuit using a peak hold circuit.

An embodiment of the invention will now be described with reference to the attached drawings, in which like elements are indicated by like reference characters.

Figure 3:
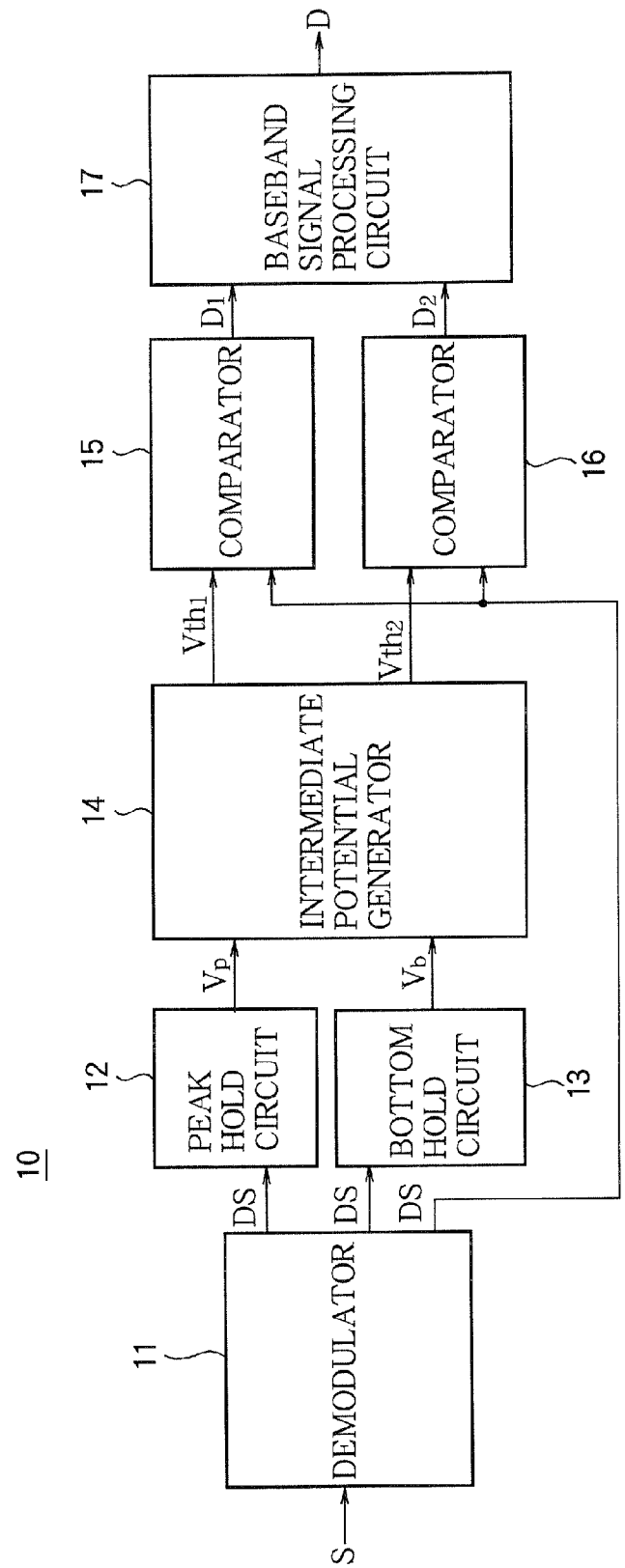
FIG. 3 is a block diagram showing an embodiment of a data slicing circuit according to the present invention.

Referring to FIG. 3, the embodiment is a data slicing circuit that receives the output of a demodulator 11 that demodulates a received signal S that has been modulated by, for example, amplitude shift keying. The signal S is received in packets, each beginning with a known data pattern or preamble, which is followed by unknown data such as address, status, and payload data. Both the known and the unknown data are transmitted at the same bit rate.

The demodulated signal DS is supplied to a peak hold circuit 12 and a bottom hold circuit 13. The peak hold circuit 12 detects peak levels in the demodulated signal DS, holds each peak level, allows the held peak level to decay at a predetermined rate, and thereby generates a peak voltage signal Vp. The bottom hold circuit 13 detects minimum or bottom levels in the demodulated signal DS and outputs a similarly generated bottom voltage signal Vb. The peak voltage signal Vp and bottom voltage signal Vb are supplied to an intermediate potential generator 14 which generates a plurality of threshold potentials intermediate between the peak voltage Vp and the bottom voltage Vb. In this embodiment the intermediate potential generator 14 generates two threshold voltages Vth1 and Vth2 that divide the potential range between Vp and Vb into three equal parts. The two threshold potentials have the following values:

$$Vth1 = (Vp-Vb)/3 + Vb = Vp/3 + 2Vb/3$$

$$Vth2 = 2(Vp-Vb)/3 + Vb = 2Vp/3 + Vb/3$$

The demodulated signal DS is also supplied to a pair of comparators 15, 16. The first comparator 15 compares the demodulated signal DS with the first threshold potential Vth1 and outputs a first binarized signal $D_1$ that is high or low depending on whether the potential level of the demodulated signal DS is greater than or less than Vth1. The second comparator 16 compares the demodulated signal DS with the second threshold potential Vth2 and outputs a second binarized signal $D_2$ that is high or low depending on whether the potential level of the demodulated signal DS is greater than or less than Vth2.

The two binarized signals $D_1$ and $D_2$ are supplied to a baseband signal processing circuit 17 that samples them, selects the binarized signal that best matches the preamble at the beginning of each packet, and outputs the selected signal as a received data signal D for the remainder of the packet. During reception of the preamble, the baseband signal processing circuit 17 samples the binarized signals $D_1$ and $D_2$ at a first rate higher than the transmitted bit rate of the received signal S. The first rate is preferably five to ten times higher than the transmitted bit rate. Thus if the preamble in the transmitted packet has a length of, say, thirty-two or sixty-four bits, the baseband signal processing circuit 17 typically obtains several hundred samples of preamble data from the packet. This number of samples is sufficient to distinguish a binarized signal that matches the preamble pattern well from a binarized signal that matches the preamble pattern poorly with a high level of statistical confidence. The baseband signal processing circuit 17 compares the samples of each binarized signal $D_1$, $D_2$ with the known values that the sample should have, and selects the binarized signal that matches the preamble data at the highest number of samples.

After selecting this binarized signal, the baseband signal processing circuit 17 continues to select it and output it as the received data signal D during the reception of the rest of the packet, now sampling the selected binarized signal ($D_1$ or $D_2$) at a second rate equal to the transmitted bit rate, thereby recovering the unknown transmitted data.

Figure 4:
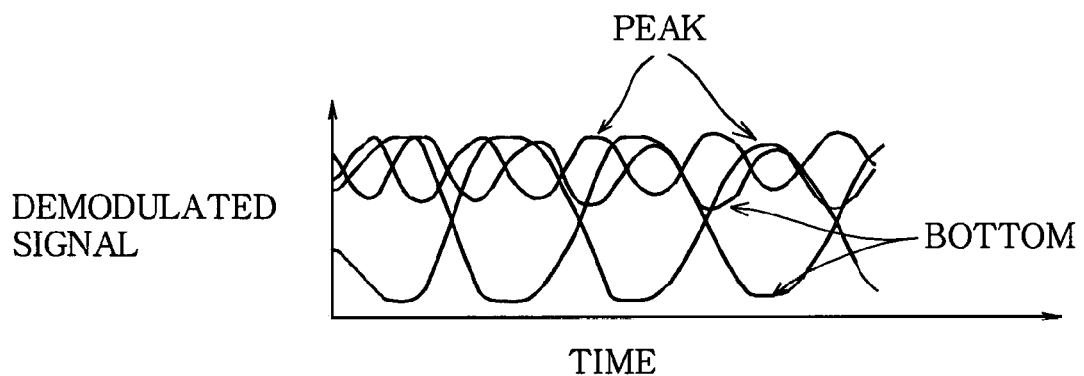
FIG. 4 is a waveform diagram illustrating asymmetric reception conditions.

FIG. 4 shows examples of signals received under different conditions that lead to identical peak levels but quite different bottom levels. With this degree of asymmetry between the behavior of the peak level and the behavior of the bottom level, use of the higher threshold potential Vth2 will generally lead to a lower error rate. Conversely, with the opposite type of asymmetry (a better-behaved bottom level), use of the lower threshold potential Vth1 will generally yield a lower error rate.

By assessing the actual error rate in the preamble and selecting the binarized signal that gives the lower error rate, the data slicing circuit in FIG. 3 can receive data with relatively few errors even if the signal is received over a channel that is asymmetrically degraded, so that one of the two binary levels of the demodulated signal (e.g., the low level) fluctuates while the other level (e.g., the high level) remains comparatively stable.

The invention is not limited to the use of two threshold potentials that divide the potential range between the peak and bottom levels into three equal parts. Any number of threshold potentials may be used, a separate comparator being provided for each, and the threshold potentials may have any desired set of values between the peak and bottom levels. For example, one of the threshold potentials may be set at the midpoint between the peak and bottom levels (Vp/2+Vb/2). Other threshold potentials may be offset from the peak value by various fixed amounts. Another threshold potential may be set at the midpoint between the peak and bottom levels when the difference between the peak and bottom levels is less than a predetermined constant W, and be offset from the peak level by W/2 (thus being set at Vp−W/2) when the difference between the peak and bottom levels is equal to or greater than W. More generally, a threshold potential Va of the following form, where 'a' is a positive constant less than unity (0<a<1), may be used:

$$Va = (1-a)Vp + aVb$$
$$= Vp - a(Vp-Vb) \quad \text{if } (Vp-Vb) < W$$
$$Va = Vp - aW \quad \text{if } (Vp-Vb) \geq W$$

That is, the threshold potential Va is offset by a first predetermined amount aW from the peak level Vp when the peak level Vp differs from the bottom level Vb by at least a second predetermined amount W, and is set proportionally between the peak level Vp and the bottom level Vb, the ratio of proportionality being a:(1−a), when the peak level Vp differs from the bottom level Vb by less than the second predetermined amount W.

The more different types of threshold potentials there are, the more versatile the data slicing circuit becomes in dealing with differing reception conditions.

Uses of the invention are not restricted to the reception of signals modulated by amplitude shift keying.

The sampling process may be carried out in the comparators instead of the baseband signal processing circuit.

Those skilled in the art will recognize that further variations are possible within the scope of the invention, which is defined in the appended claims.

What is claimed is:

1. A data slicing circuit for binarizing a demodulated signal including a known data pattern followed by unknown data, comprising:

a peak hold circuit for detecting and holding a peak level of the demodulated signal;

a bottom hold circuit for detecting and holding a bottom level of the demodulated signal;

an intermediate potential generator for generating a plurality of threshold potentials intermediate between the peak level of the demodulated signal and the bottom level of the demodulated signal;

a plurality of comparators for comparing the demodulated signal with respective threshold potentials generated by the intermediate potential generator, thereby generating a plurality of binarized signals; and a baseband signal processing circuit for comparing the known data pattern with corresponding parts of the plurality of binarized signals, selecting one of the binarized signals best matching the known data pattern, and using the selected binarized signal to recover the unknown data, wherein the plurality of threshold potentials include a potential offset by a first predetermined amount from the peak level when the peak level differs from the bottom level by at least a second predetermined amount, and set proportionally between the peak level and the bottom level when the peak level differs from the bottom level by less than the second predetermined amount.

\* \* \* \* \*